(12) United States Patent
Yamashita (10) Patent No.: US 10,521,169 B2
(45) Date of Patent: Dec. 31, 2019

(54) PRINT DATA GENERATION DEVICE, METHOD FOR CONTROLLING PRINT DATA GENERATION DEVICE, AND PROGRAM

(71) Applicant: Seiko Epson Corporation, Tokyo (JP)

(72) Inventor: Mitsuhiro Yamashita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 635 days.

(21) Appl. No.: 14/956,320

(22) Filed: Dec. 1, 2015

(65) Prior Publication Data

US 2016/0170698 A1 Jun. 16, 2016

(30) Foreign Application Priority Data

Dec. 12, 2014 (JP) ................................ 2014-252305

(51) Int. Cl.
*G06F 3/12* (2006.01)

(52) U.S. Cl.
CPC .......... *G06F 3/1256* (2013.01); *G06F 3/1204* (2013.01); *G06F 3/1208* (2013.01); *G06F 3/1251* (2013.01)

(58) Field of Classification Search
CPC ............................. G06F 3/1256; G06F 3/1204
See application file for complete search history.

(56) References Cited

U.S. PATENT DOCUMENTS

| 8,681,372 | B2 * | 3/2014 | De Munck | B41J 3/4075 358/1.15 |
| 2007/0013950 | A1 | 1/2007 | Kajihara | |
| 2007/0125843 | A1 * | 6/2007 | Byerly | B41J 3/407 235/380 |
| 2007/0180397 | A1 * | 8/2007 | Hoyer | G06F 3/04886 715/780 |
| 2010/0289820 | A1 * | 11/2010 | Hoyer | G06F 3/04886 345/619 |
| 2013/0009907 | A1 * | 1/2013 | Rosenberg | G06F 3/046 345/174 |
| 2013/0070261 | A1 | 3/2013 | Kimura | |

FOREIGN PATENT DOCUMENTS

| CN | 103009823 A | 4/2013 |
| JP | 1-306916 A | 12/1989 |
| JP | 2007-021903 A | 2/2007 |

\* cited by examiner

*Primary Examiner* — Kavita Padmanabhan
*Assistant Examiner* — Ahmad M El-Bkaily
(74) *Attorney, Agent, or Firm* — Workman Nydegger (57) ABSTRACT

A host device to which a print data generation device according to the invention is applied includes: a preview display unit which displays a handwritten input trajectory on a tape image showing an outer shape of a tape; a display control unit which performs display control of the preview display unit; and a print data generation unit which generates print data to print an image based on the input trajectory, on the tape with a size based on the tape image displayed by the preview display unit. The display control unit enlarges the tape image to include the handwritten input trajectory if the handwriting is performed outside the tape image.

16 Claims, 11 Drawing Sheets

PRINT DATA GENERATION DEVICE, METHOD FOR CONTROLLING PRINT DATA GENERATION DEVICE, AND PROGRAM

CROSS-REFERENCE TO RELATED APPLICATION

The entire disclosure of Japanese Patent Application No. 2014-252305, filed Dec. 12, 2014 is expressly incorporated by reference herein.

BACKGROUND

1. Technical Field

The present invention relates to a print data generation device, a method for controlling a print data generation device and a program for generating print data on the basis of input information inputted on a tape image and which particularly enable handwritten input outside a prescribed area.

2. Related Art

According to the related art, as a print data generation device which generates print data on the basis of input information inputted on a tape image, JP-A-2007-021903 is known, for example. JP-A-2007-021903 discloses a print data generation device including: an input unit such as a keyboard or mouse; a display unit which displays input information inputted via the input unit, on a tape image showing an outer shape of a tape; and a print data generation unit which generates print data to obtain a print result equivalent to a display content on the display unit, on the basis of a print instruction by a user.

Meanwhile, as an input device which enables handwritten input outside a prescribed area, JP-A-1-306916 is known, for example. JP-A-1-306916 discloses an input device including: a discrimination unit which discriminates whether an input position of handwriting is outside a valid area or not; and a scroll control unit which allows the valid area to be scrolled so that the input position enters the valid area, if the input position is discriminated as being outside the valid area by the discrimination unit. With this configuration, JP-A-1-306916 has effects such as there is no need to perform a separate scroll operation in the case of drawing a large graphic pattern.

In the print data generation device as disclosed in JP-A-2007-021903, it is expected that information may be handwritten. In such cases, it is also expected as a matter of course that the input trajectory of the handwritten input may extend beyond the tape image. Thus, it is conceivable that the technique of JP-A-1-306916 may be applied to JP-A-2007-021903 so that the tape image can be scrolled if the input trajectory extends beyond the tape image. However, if the tape image is scrolled, the entirety of the tape image cannot be viewed, which is rather inconvenient, though operability in the case of drawing a large graphic pattern is improved.

SUMMARY

An advantage of some aspects of the invention is to provide a print data generation device, a method for controlling a print data generation device and a program which enable improvement in convenience of handwritten input at the time of generating print data on the basis of a handwritten input trajectory on a tape image.

A print data generation device according to an aspect of the invention includes: a preview display unit which displays a handwritten input trajectory on a tape image showing an outer shape of a tape; a display control unit which performs display control of the preview display unit; and a print data generation unit which generates print data to print an image based on the input trajectory, on the tape with a size based on the tape image displayed by the preview display unit. The display control unit enlarges the tape image to include the handwritten input trajectory if the handwriting is performed outside the tape image.

A method for controlling a print data generation device according to another aspect of the invention includes: displaying a handwritten input trajectory on a tape image showing an outer shape of a tape; and generating print data to print an image based on the input trajectory, on the tape with a size based on the tape image displayed in the displaying of the input trajectory. In the displaying of the input trajectory, the tape image is enlarged to include the handwritten input trajectory if the handwriting is performed outside the tape image.

According to these configurations, the tape image is enlarged to include the handwritten input trajectory if the handwriting is performed outside the tape image. Therefore, the time and effort of the user to manually enlarge the tape image can be saved.

The "handwriting outside the tape image" is a concept including not only the case where an input trajectory with the start point inside the tape image extends beyond the tape image, but also the case where the start point of an input trajectory is outside the tape image.

In the print data generation device according to the aspect of the invention, the display control unit may enlarge the tape image in a longitudinal direction and not enlarge the tape image in a direction of width.

This configuration is suitable for an ordinary tape printing device that cannot vary the tape width according to print data.

In the print data generation device according to the aspect of the invention, the display control unit may enlarge the tape image in the longitudinal direction in such a way that a coordinate of a position extended outward in the longitudinal direction of the tape image by a predetermined length from an end coordinate of the input trajectory in the longitudinal direction of the tape image becomes an end coordinate of the tape image.

According to this configuration, since a margin with a predetermined length is constantly provided at the forward end or rear end in the longitudinal direction of the tape image, the user does not feel uneasy even if the print data generation device has a low display processing capability, causing the enlargement of the tape image to be slower than the handwriting speed.

In the print data generation device according to the aspect of the invention, if the end part of the input trajectory in the longitudinal direction of the tape image is erased, the display control unit may reduce the tape image in the longitudinal direction in such a way that a coordinate of a position extended outward in the longitudinal direction of the tape image by a predetermined length from the end coordinate after the erasure of the input trajectory becomes the end coordinate of the tape image.

According to this configuration, since the tape image is reduced in the longitudinal direction in response to the erasure of the input trajectory, the time and effort of the user to manually reduce the tape image can be saved.

In the print data generation device according to the aspect of the invention, the preview display unit may be able to display input information including the input trajectory that is handwritten and non-handwritten information that is a letter or image other than the handwritten input trajectory, on the tape image. The print data generation unit may generate the print data to print an image based on the input information.

According to this configuration, not only the handwritten input trajectory but also a letter inputted or an image selected via the keyboard or the like can be printed on the tape.

In the print data generation device according to the aspect of the invention, the display control unit may enlarge or reduce the tape image on condition that the end coordinate of the input trajectory in the longitudinal direction of the tape image is further to the outside in the longitudinal direction than the end coordinate of the non-handwritten information.

According to this configuration, since the tape image is enlarged or reduced on condition that the end coordinate of the input trajectory is further to the outside in the longitudinal direction than the end coordinate of the non-handwritten information, the non-handwritten information is not erased by the enlargement or reduction of the tape image.

In the print data generation device according to the aspect of the invention, the display control unit may predict a direction of movement of the input trajectory according to change in the input trajectory and enlarge the tape image on the basis of the result of the prediction.

In the print data generation device according to the aspect of the invention, the display control unit may predict an amount of movement per unit time of the input trajectory according to change in velocity or change in acceleration of the input trajectory and decide an amount of enlargement of the tape image on the basis of the result of the prediction.

According to these configurations, the direction of movement of the input trajectory is predicted and the tape image is enlarged on the basis of the result of the prediction. Therefore, the convenience of handwriting can be improved further. Also, by increasing the amount of enlargement of the tape image as the input speed increases or as the rate of change in the input speed per unit time (input acceleration) increases, it is possible to perform quicker input.

A program according to still another aspect of the invention causes a computer to function as each unit in the print data generation device according to the aspect of the invention.

Executing this program enables realization of a print data generation device in which the convenience of handwriting at the time of generating print data on the basis of an input trajectory handwritten on a tape image can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
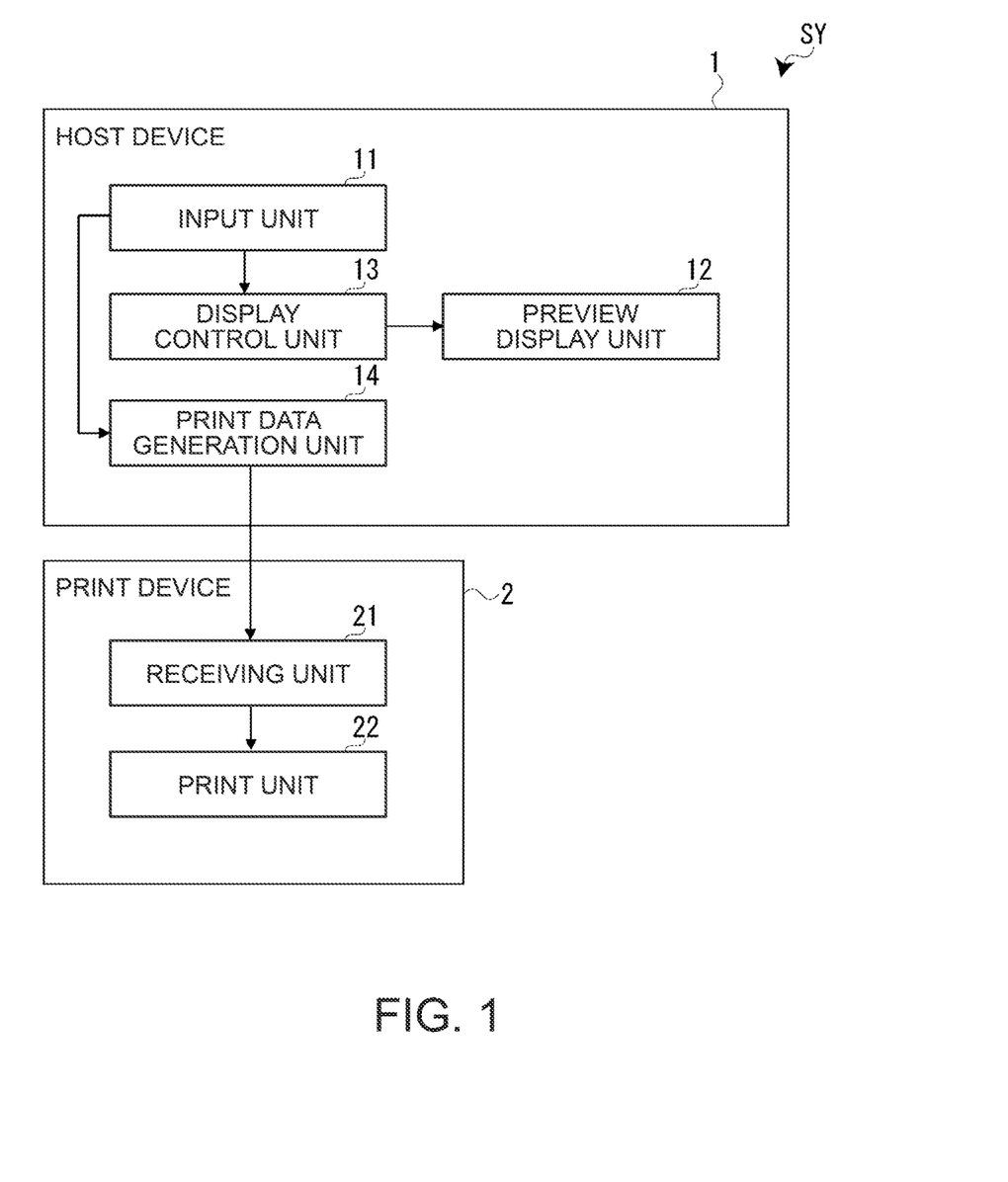
FIG. 1 is a block diagram showing the functional configuration of a print system according to an embodiment of the invention.

Hereinafter, a print data generation device, a method for controlling a print data generation device and a program according to an embodiment of the invention will be described in detail with reference to the accompanying drawings. FIG. 1 is a block diagram showing the functional configuration of a print system SY according to an embodiment of the invention. The print system SY includes a host device 1 (print data generation device) which generates print data, and a print device 2 which performs printing on the basis of the print data received from the host device 1. The host device 1 and the print device 2 are connected together via wired or wireless communications. The form of connection may be one-to-one connection or may be network connection.

The host device 1 has an input unit 11, a preview display unit 12, a display control unit 13 and a print data generation unit 14, as main functions. These functions are realized by a label preparation application, not shown, installed in the host device 1. As the host device 1, a personal computer, PDA (personal digital assistants), a mobile phone, or various tablet terminals (including smartphone), or the like is used.

The input unit 11 performs information input, using various pointing devices such as a mouse or pen tablet, as well as a keyboard. The input unit 11 can input letters via the keyboard and input images selected by the mouse or the like (including decorative images such as the ideogram called "emoji" and frames), and also enables handwriting with the use of various pointing devices. Hereinafter, handwritten information is called an "input trajectory 50" and information that is not the handwritten input trajectory 50 is called "non-handwritten information 60" (see FIG. 3 and the like).

Figure 3:
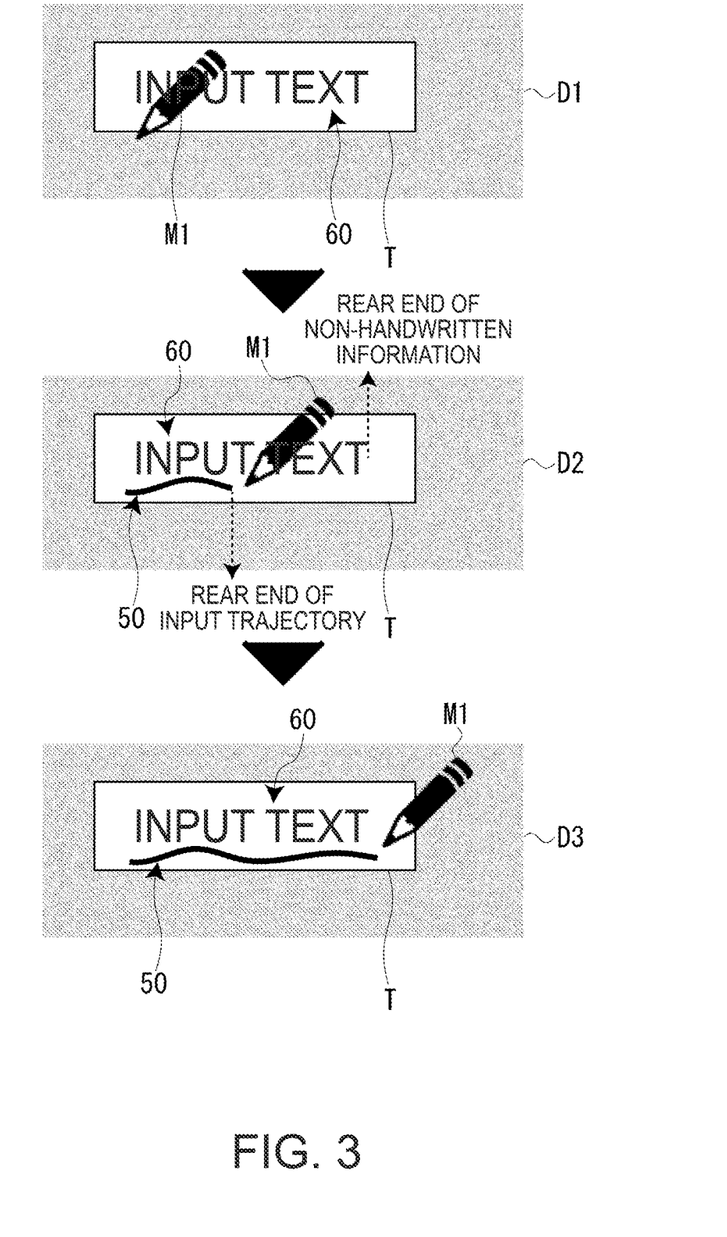
FIG. 3 is a screen transition view showing change in the tape length in the case where the input trajectory is extended.

The preview display unit 12 is configured to display a preview of print data and displays input information including the handwritten input trajectory 50 and the non-handwritten information 60 inputted by a method other than handwriting, on a tape image T showing the outer shape of a tape-like print medium (hereinafter simply referred to as a "tape"), as shown in FIG. 3 and the like. The preview display unit 12 may perform display on a touch panel with a display which functions as the input unit 11 as well, or may perform display on a display unit separate from the input unit 11.

The display control unit 13 performs display control of the preview display unit 12. For example, if handwriting is done outside the tape image T, the display control unit 13 enlarges the tape image T in the longitudinal direction thereof (direction of tape length) so as to include the handwritten input trajectory 50. Also, if an end part of the input trajectory 50 in the longitudinal direction of the tape image T is erased, the display control unit 13 reduces the tape image T in the longitudinal direction. In this embodiment, the tape image T is enlarged or reduced only in the longitudinal direction and is not enlarged or reduced in the direction of width (direction orthogonal to the longitudinal direction). Hereinafter, the expressions "enlarge or reduce", "outside or inside", "end part" and "outermost" refer to "enlarge or reduce", "outside or inside", "end part" and "outermost" in the longitudinal direction unless stated otherwise.

The print data generation unit 14 generates print data to print an image based on the input information (input trajectory 50 and non-handwritten information 60), on a tape with a size based on the tape image T displayed on the preview display unit 12 (tape having an aspect ratio substantially equal to that of the tape image T). The print data may be described by a print command compatible with the print device 2 or may be described in a general-purpose language such as markup language.

The print device 2 is a label printer which performs printing on a tape as a print medium and thus prepares a label. The print device has a receiving unit 21 and a print unit 22, as main functions. Although not particularly illustrated, the tape is supplied in the state of being accommodated in a tape cartridge. The tape has a three-layer structure made up of a print layer, an adhesive layer and a release layer. When using this tape as a label, the user strips off the release layer and attaches the adhesive layer to an attachment target.

The receiving unit 21 receives the print data from the host device 1. The print unit 22 includes a print head, a carrying mechanism and a cutting mechanism, and performs printing on the tape reeled off from the tape cartridge on the basis of the print data outputted from the receiving unit 21. After the printing, the printed tape part is separated by the cutting mechanism. As the print method of the print unit 22, any type of method may be used such as a thermal transfer method, an ink jet method, or a dot impact method.

Figure 2A:
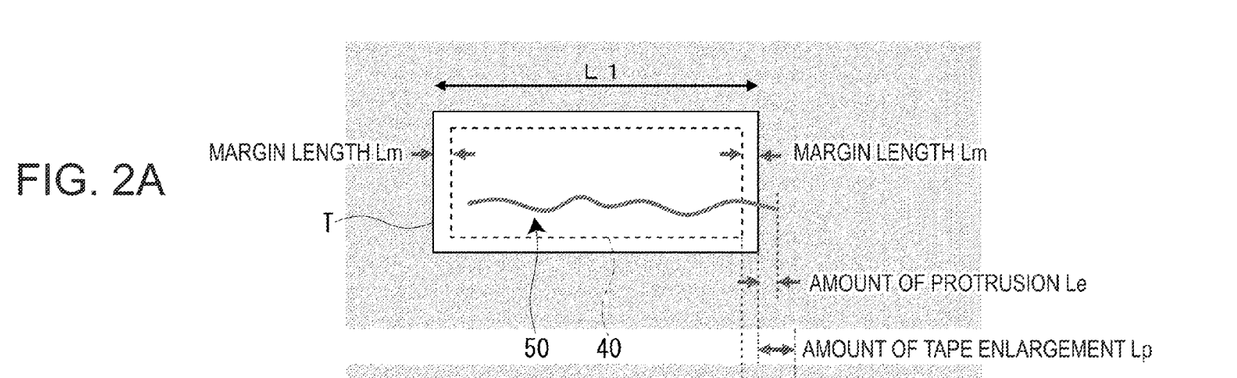
FIGS. 2A and 2B are explanatory views concerning the relation between the amount of protrusion of a handwritten input trajectory and the amount of tape enlargement, and the calculation of the tape length after tape enlargement.
Figure 2B:
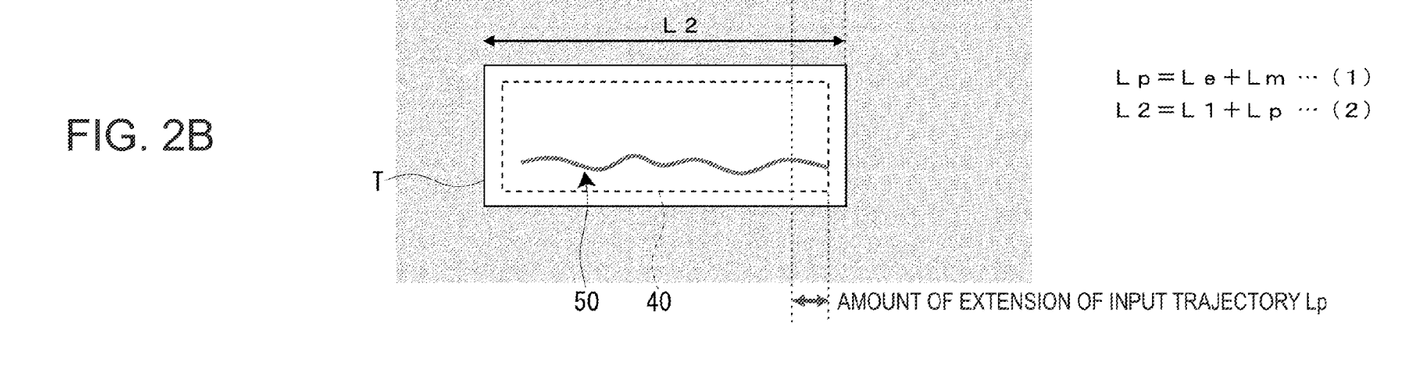

Next, the enlargement of the tape image T (hereinafter referred to as an "amount of tape enlargement Lp") caused by the extension of the input trajectory 50 will be described with reference to FIGS. 2A and 2B. FIG. 2A shows an example of display of the tape image T before being enlarged. FIG. 2B shows an example of display of the tape image T after being enlarged. If no information is inputted, the preview display unit 12 displays the tape image T with a predetermined length on the basis of the tape width obtained from the result of detection of the tape cartridge in the print device 2.

As shown in FIGS. 2A and 2B, an input available area 40 is set inside the tape image T. The input available area 40 is shown by dashed lines as a matter of convenience of explanation. The input available area 40 is a rectangular area in which the coordinate situated to the inside from the forward end of the tape image T (the right-hand side in FIGS. 2A and 2B) by the amount of a margin length Lm is defined as a forward end coordinate and in which the coordinate situated to the inside from the rear end of the tape image T (the left-hand side in FIGS. 2A and 2B) by the amount of the margin length Lm is defined as a rear end coordinate. If handwriting is done beyond the input available area 40, as shown in FIG. 2A, the display control unit 13 extends the tape length of the tape image T, as shown in FIG. 2B. The amount of tape enlargement Lp in this case is equal to the amount of protrusion Le of the input trajectory 50 from the tape image T (the difference between the outermost coordinate of the input trajectory 50 and the rear end coordinate of the tape image T in the longitudinal direction of the tape image T) plus the margin length Lm (see the equation (1)). The amount of tape enlargement Lp is equal to the amount of extension Lp of the input trajectory 50 (the amount of protrusion of the input trajectory 50 from the input available area 40). The tape length L2 after being extended is the tape length L1 before being extended plus the amount of tape enlargement Lp (see the equation (2)).

While FIGS. 2A and 2B illustrate the case where the input trajectory 50 is extended toward the rear end of the tape image T, the tape length is similarly extended in the case where the input trajectory 50 is extended toward the forward end of the tape image T. However, the extension of the tape length is limited to the case where the setting of tape length is "free length". The tape length is not extended if the setting of tape length is "fixed length".

Figure 4:
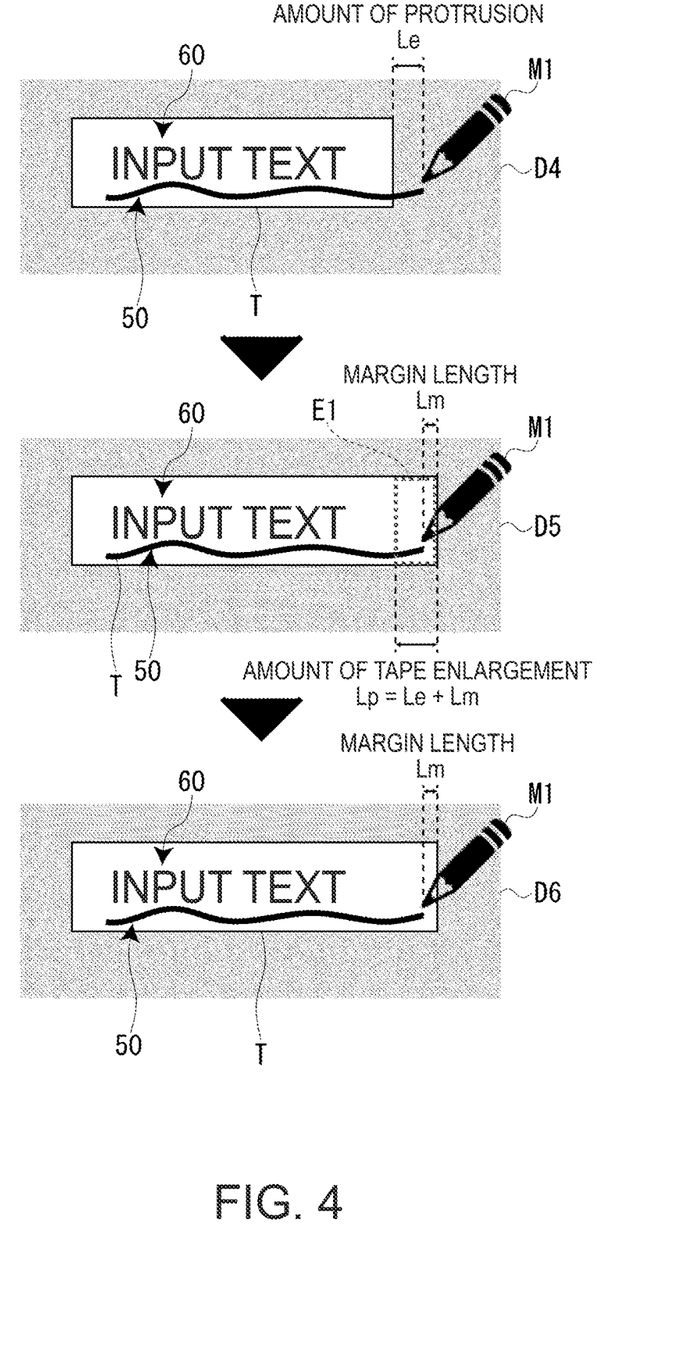
FIG. 4 is a screen transition view continuing from FIG. 3.
Figure 5:
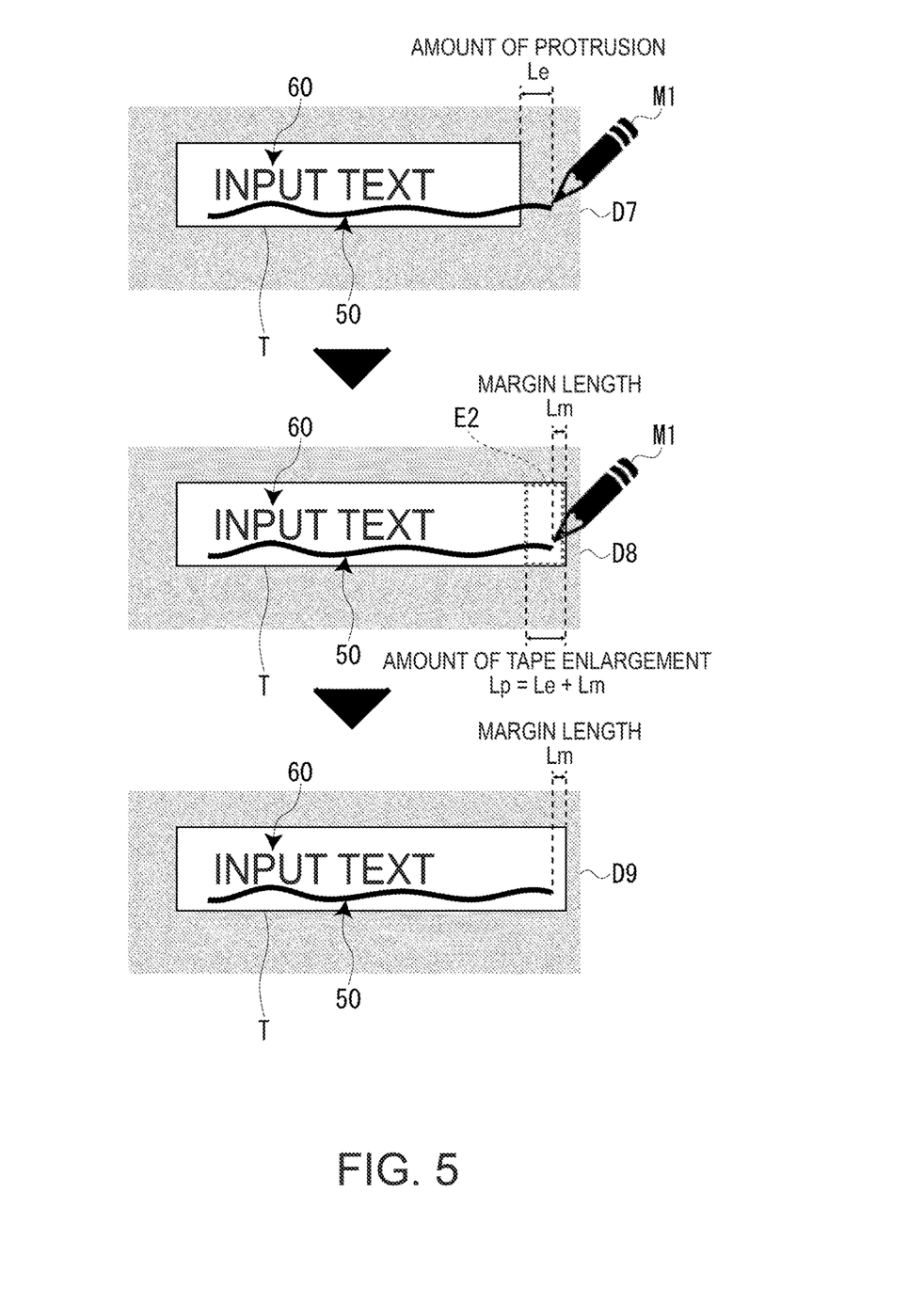
FIG. 5 is a screen transition view continuing from FIGS. 3 and 4.

Next, the display control by the display control unit 13 will be described using specific examples and with reference to the screen transition views of FIGS. 3 to 8. FIGS. 3 to 5 show a specific example in the case where the input trajectory 50 is extended. As shown in a screen D1 in FIG. 3A, when a handwriting mode is actuated and a type of pen is selected, the preview display unit 12 displays a pen mark M1. The user carries out handwriting by moving the pen mark M1. FIG. 3A also shows an example where the non-handwritten information 60 (letters of "INPUT TEXT") is inputted before the handwriting mode is actuated.

If the input trajectory 50 is extended, for example, as shown a screen D2 from the state of the screen D1, the tape length is not varied yet at this point. This is because the rear end of the input trajectory 50 is not situated further to the outside (to the right in the illustration) than the rear end of the non-handwritten information 60. In FIG. 3, the forward end of the input trajectory 50 is assumed to be inside the input available area 40 (see FIGS. 2A and 2B). Even if the input trajectory 50 is extended further as shown in a screen D3 from the state of the screen D2, the tape length is not varied yet. This is because the rear end of the input trajectory 50 is inside the input available area 40 (see FIGS. 2A and 2B).

Subsequently, if the rear end of the input trajectory 50 goes beyond the rear end of the tape image T, for example, as shown in a screen D4 in FIG. 4, the tape length is extended as shown in screen D5. A frame E1 indicated by dotted lines in FIG. 4 represents the enlarged area of the tape image T. The amount of tape enlargement Lp in this case is equal to the amount of protrusion Le of the input trajectory 50 from the tape image T plus the margin length Lm. A screen D6 shows the state after the extension of the tape length. In this way, the tape image T is enlarged in such away that the part situated to the outside from the rear end of the input trajectory 50 by the amount of the margin length Lm becomes the rear end of the tape image T.

Subsequently, if the input trajectory 50 is extended further, as shown in a screen D7 in FIG. 5, the tape length is extended as shown in screen D8 (see a frame E2 indicated by dotted lines). Also the amount of tape enlargement Lp in this case is equal to the sum of the amount of protrusion Le and the margin length Lm. A screen D9 shows the state after the extension of the tape length. The rear end of the tape image T is situated to the outside from the rear end of the input trajectory 50 by the amount of the margin length Lm. In this way, the display control unit 13 enlarges the tape image T in real time with the extension of the input trajectory 50.

Figure 6:
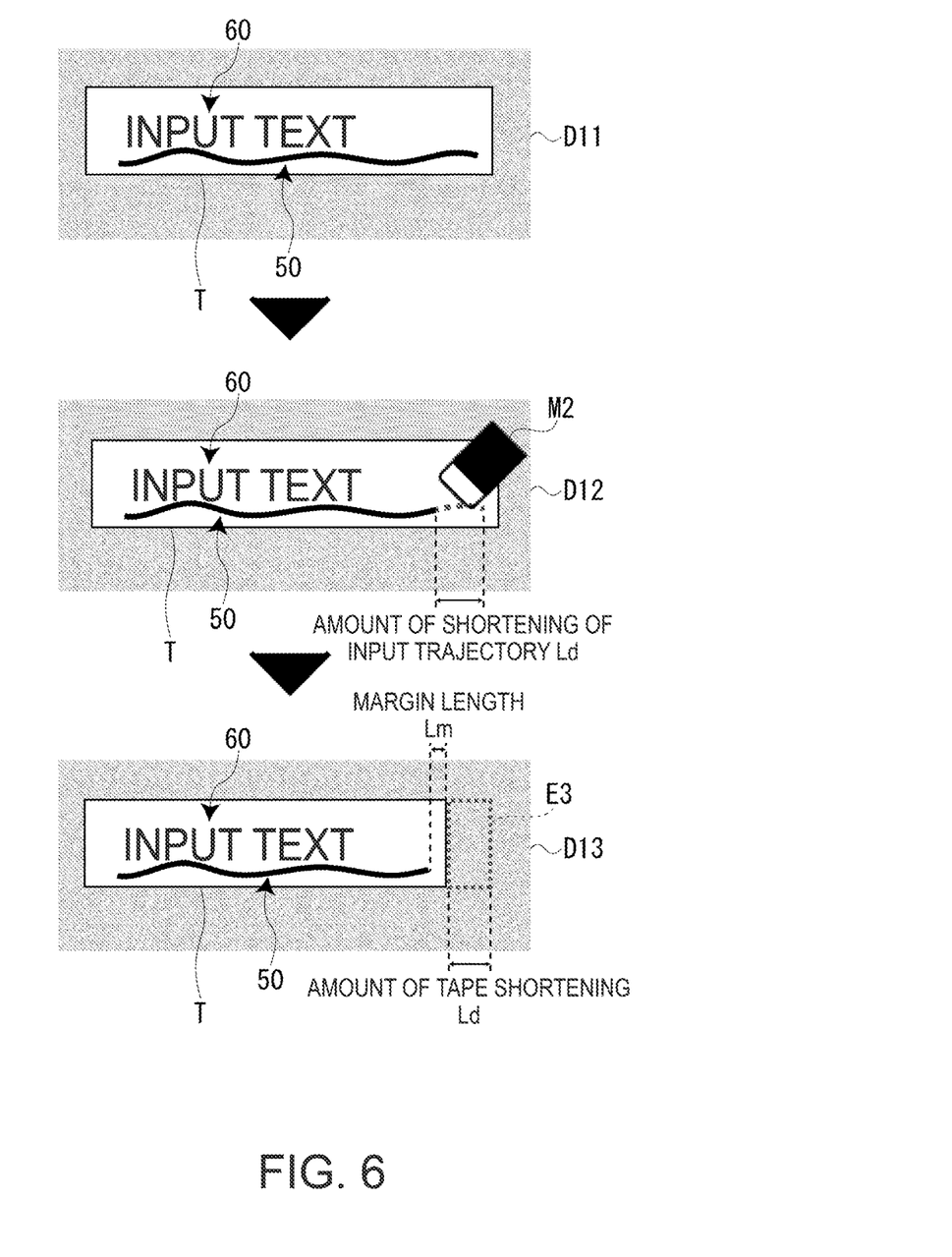
FIG. 6 is a screen transition view showing change in the tape length in the case where the input trajectory is shortened.
Figure 7:
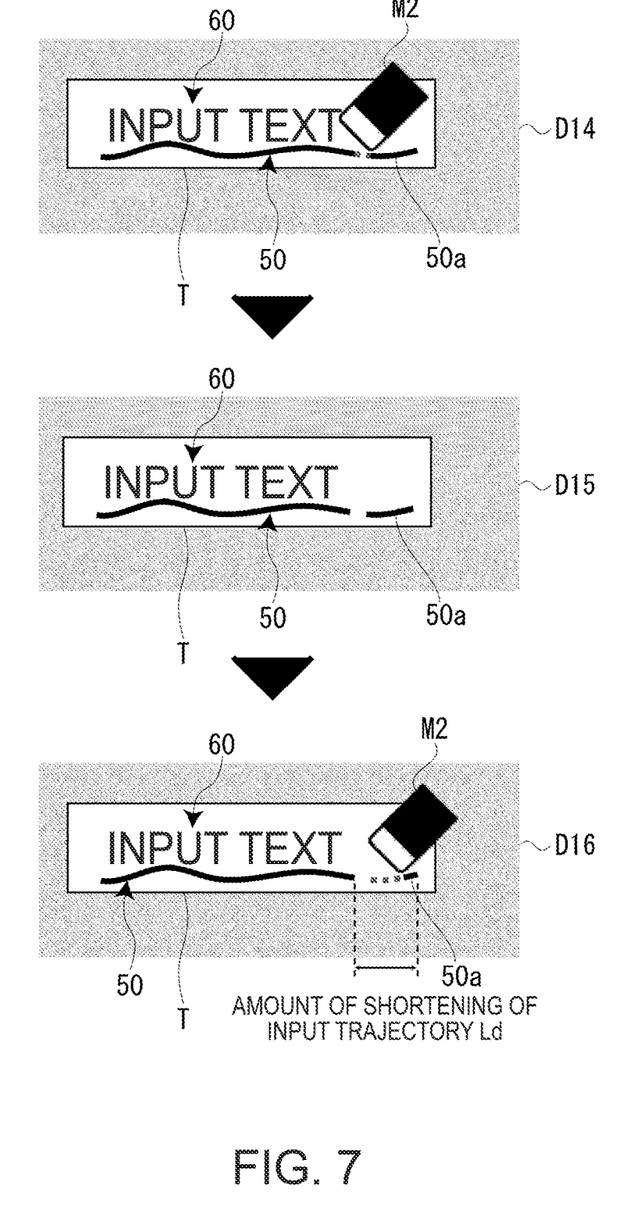
FIG. 7 is a screen transition view continuing from FIG. 6.

Next, a specific example of display control in the case where the input trajectory 50 is shortened will be described with reference to the screen transition views of FIGS. 6 to 8. A screen D11 in FIG. 6 shows the state where the input trajectory 50 and the non-handwritten information 60 (letters of "INPUT TEXT") are already inputted. When a type of eraser is selected in the handwriting mode, an eraser mark M2 is displayed, as shown in a screen D12. The user erases the input trajectory 50 by moving the eraser mark M2 on the input trajectory 50. The non-handwritten information 60 cannot be erased with the eraser mark M2. In FIG. 6, a dotted line extending from the input trajectory 50 indicates the part of the input trajectory 50 erased with the eraser mark M2 (the part of the input trajectory 50 is shorten).

If the end of the input trajectory 50 is erased as shown in a screen D12, the tape length is reduced as shown in a screen D13. A frame E3 indicated by dotted lines in FIG. 6 indicates the reduced area of the tape image T. The amount of tape reduction Ld in this case is equal to the amount of shortening Ld of the input trajectory 50. In the case of reducing the tape length, too, the rear end of the tape image T after being reduced is situated to the outside from the rear end of the input trajectory 50 by the amount of the margin length Lm.

Subsequently, if a part of the center part (not the end parts) of the input trajectory 50 is erased with the eraser mark M2, for example, as shown in a screen D14 in FIG. 7, a part of the input trajectory 50 is missing as shown in a screen D15. In this way, if the erased part of the input trajectory 50 is small and the area or length of a remaining part 50a of the input trajectory 50 is equal to or above a predetermined threshold, the tape length is not reduced. On the other hand, if the area or length of the remaining part 50a of the input trajectory 50 is below the predetermined threshold, as shown in a screen D16, the remaining part 50a is regarded as a slight erasing failure and the tape length is reduced. In FIG. 7, the part indicated by a dotted line that is equivalent to a part of the input trajectory 50 represents the part of the input trajectory 50 erased with the eraser mark M2. The amount of shortening Ld of the input trajectory 50 in this case is equivalent to the sum of the erased part and the erasing failure part (the difference between the end coordinate of the input trajectory 50 before erasure and the end coordinate of the input trajectory 50 after erasure).

Figure 8:
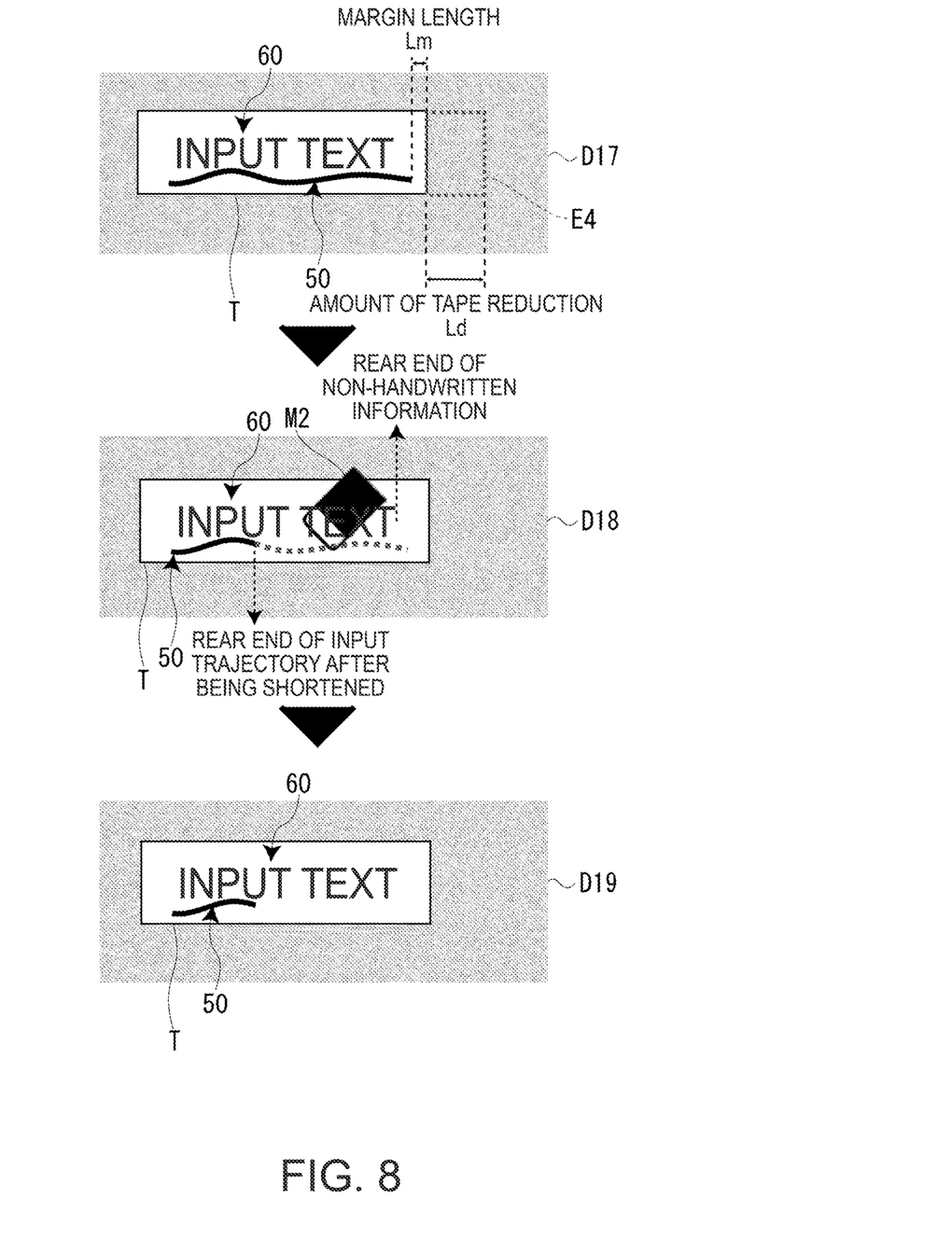
FIG. 8 is a screen transition view continuing from FIGS. 6 and 7.

A screen D17 in FIG. 8 shows the state after the tape length is reduced. As shown in FIG. 8, the amount of tape reduction Ld is equal to the amount of shortening Ld of the input trajectory 50. A frame E4 indicated by dotted lines in FIG. 8 represents the reduced area of the tape image T. Subsequently, even if the input trajectory 50 is further shortened, for example, as shown in a screen D18, the tape length is not varied. This is because the rear end of the input trajectory 50 after being shortened is situated to the inside (the left-hand side in the illustration) from the rear end of the non-handwritten information 60. In FIG. 8, a dotted line extending from the input trajectory 50 indicates the part of the input trajectory 50 erased with the eraser mark M2. A screen D19 shows the state after the input trajectory 50 is shortened. In this way, the display control unit 13 reduces the tape image T in real time with the shortening of the input trajectory 50.

Figure 9:
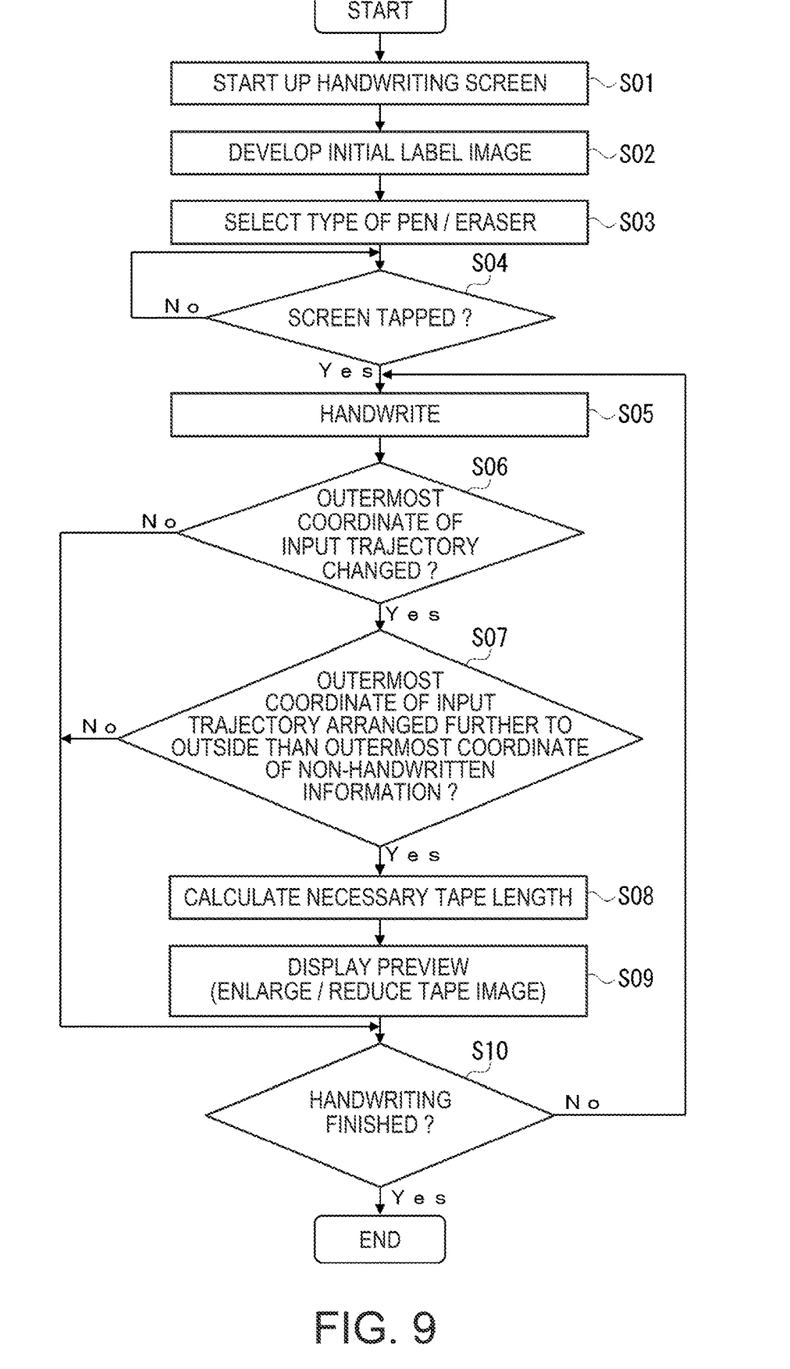
FIG. 9 is a flowchart showing a flow of handwriting processing.

Next, the flow of handwriting processing will be described with reference to the flowchart of FIG. 9. As the host device 1 starts up a handwriting screen in response to an operation of shifting to the handwriting mode by the user (S01), the host device 1 develops an initial label image (displays a preview, S02). Here, the initial label image may include the non-handwritten information 60. Subsequently, as a type of pen or eraser is selected (S03) and the handwriting screen is tapped by the user (S04: Yes), handwriting is started (S05). The type of pen refers to pen color, breadth of the pen (line width), type of line drawn with the pen (solid line, dotted line, dashed line or the like), or the like. The type of eraser refers to the breadth of the eraser (erasing width) or the like.

Subsequently, the host device 1 determines whether the outermost coordinate of the input trajectory 50 is changed by handwriting or not (S06). The expression "the outermost coordinate is changed" includes that the end of the input trajectory 50 is extended, that the end of the input trajectory 50 is erased, and that the end of the input trajectory 50 is erased with a part thereof left as it is (less than a predetermined area threshold or predetermined length threshold). If the outermost coordinate of the input trajectory 50 is changed (S06: Yes), whether the outermost coordinate of the input trajectory 50 is arranged further to the outside than the outermost coordinate of the non-handwritten information 60 or not, is determined (S07). That is, whether the outermost coordinate of the input trajectory 50 that is the target of change is the outermost coordinate of the input information or not, is determined.

If the outermost coordinate of the input trajectory 50 is arranged further to the outside than the outermost coordinate of the non-handwritten information 60 (S07: Yes), the host device 1 calculates a necessary tape length (label length) (S08). Here, if the input trajectory 50 is extended in S05, the tape length after being extended is calculated, whereas if the input trajectory 50 is reduced, the tape length after being reduced is calculated. Print data is generated on the basis of the result of the calculation.

Meanwhile, the host device 1 performs preview display on the preview display unit 12 on the basis of the result of the calculation (enlarges or reduces the tape image T, S09). Subsequently, whether the handwriting is finished or not is determined (S10). If the handwriting is finished (S10: Yes), the series of handwriting processing ends. If the handwriting is not finished (S10: No), the processing returns to S05. If the result is "No" in S06 and S07, the processing goes to S10, omitting S08 and S09.

As described above, according to the embodiment, for example, if handwriting is carried out outside the tape image T, the tape image T is enlarged so as to include the handwritten input trajectory. Therefore, the time and effort of the user to manually enlarge the tape image T can be omitted. Also, if the input trajectory 50 is erased, the tape image T is reduced accordingly and therefore the time and effort to manually reduce the tape image T can be omitted as well.

If the end coordinate of the input trajectory 50 is changed, the tape image T is enlarged or reduced in the longitudinal direction so that the coordinate of a position extended to the outside by a predetermined length (margin length Lm) becomes the end coordinate of the tape image T. Therefore, in the resulting display, a margin with a predetermined length is constantly provided at the forward end or rear end in the longitudinal direction of the tape image T. Thus, the user does not feel uneasy even if the host device has a low display processing capability, causing the enlargement of the tape image T to be slower than the handwriting speed.

Also, since the tape image T is enlarged or reduced on condition that the end coordinate of the input trajectory 50 is further to the outside than end coordinate of the non-handwritten information 60, the non-handwritten information 60 can be prevented from being erased by the enlargement or reduction of the tape image T.

The embodiment is not limiting and the following modifications can also be employed.

Modification 1

While the display control unit 13 in the embodiment enlarges the tape image T if the input trajectory 50 extends beyond the input available area 40, the display control unit 13 may predict the direction of movement of the input trajectory 50 according to change in the input trajectory 50 and enlarge the tape image T on the basis of the result of the prediction. Also, the display control unit 13 may predict the amount of movement per unit time of the input trajectory 50 according to change in velocity or change in acceleration of the input trajectory 50 and decide an amount of enlargement of the tape image T on the basis of the result of the prediction. According to these configurations, since the direction of movement of the input trajectory 50 is predicted and the tape image T is enlarged in the direction of movement, the convenience of handwriting can be improved further. Also, by increasing the amount of enlargement of the tape image T as the input speed increases or as the input acceleration increases, it is possible to perform quicker input.

Also, in addition to the enlargement of the tape image T with the extension of the input trajectory 50, when the input trajectory 50 is eased, the direction of erasure and the amount of movement per unit may be predicted and the tape image T may be reduced on the basis of the result of the prediction.

Modification 2

Figure 10A:
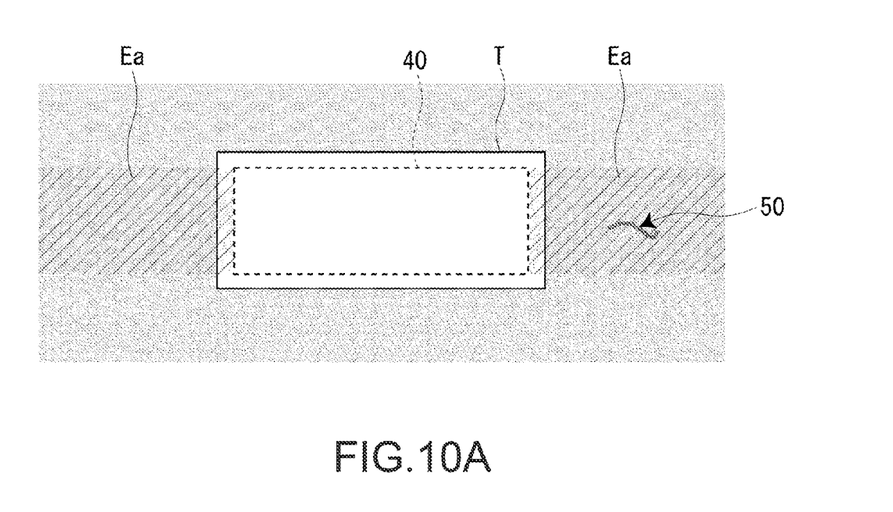
FIGS. 10A and 10B are explanatory views of Modification 2.
Figure 10B:
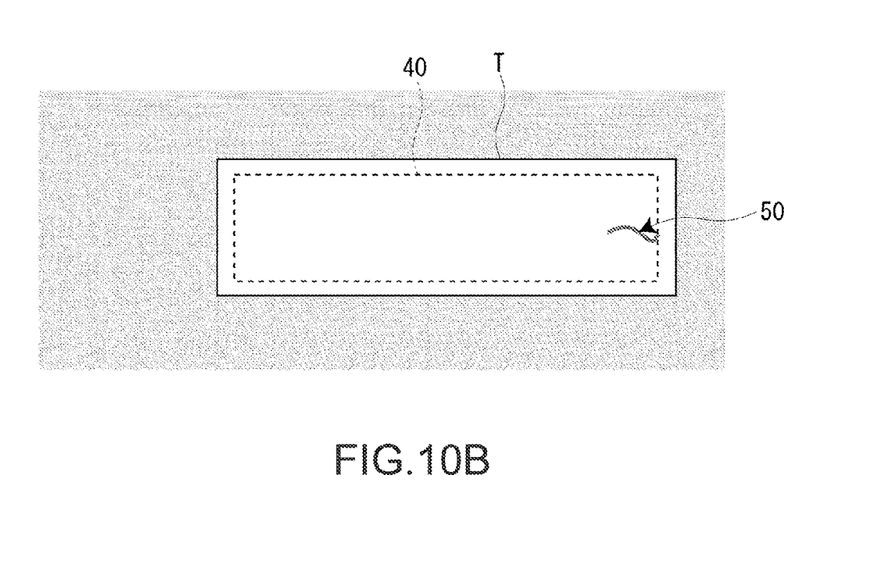

In the embodiment, an example in which the tape length is extended if the input trajectory 50 having the start point inside the input available area 40 extends beyond the input available area 40 is described. However, the start point of the input trajectory 50 may be outside the input available area 40 (outside the tape image T). For example, if the input trajectory 50 equal to or above the predetermined area threshold or equal to or above the predetermined length threshold is drawn in a tape enlargement target area Ea shown as a shaded part, as shown in FIG. 10A, the tape length may be extended so as to include this input trajectory 50 (see FIG. 10B).

Modification 3

In the embodiment, the tape image T is enlarged only in the longitudinal direction and is not enlarged in the direction of width. However, the tape image T may be able to be enlarged in the direction of width. In this case, the tape width may be increased step by step (discretely), instead of linearly broadening the tape width. That is, every time the input position of the input trajectory 50 (input coordinate in the direction of width) extends beyond the end coordinate in the direction of width of the input available area 40, the tape width may be broadened step by step according to the setting of the tape width (6 mm, 12 mm, 18 mm and the like). Also, if the tape width is broadened, it is preferable to show a display prompting the user to change the tape (tape cartridge) to be used.

Figure 11:
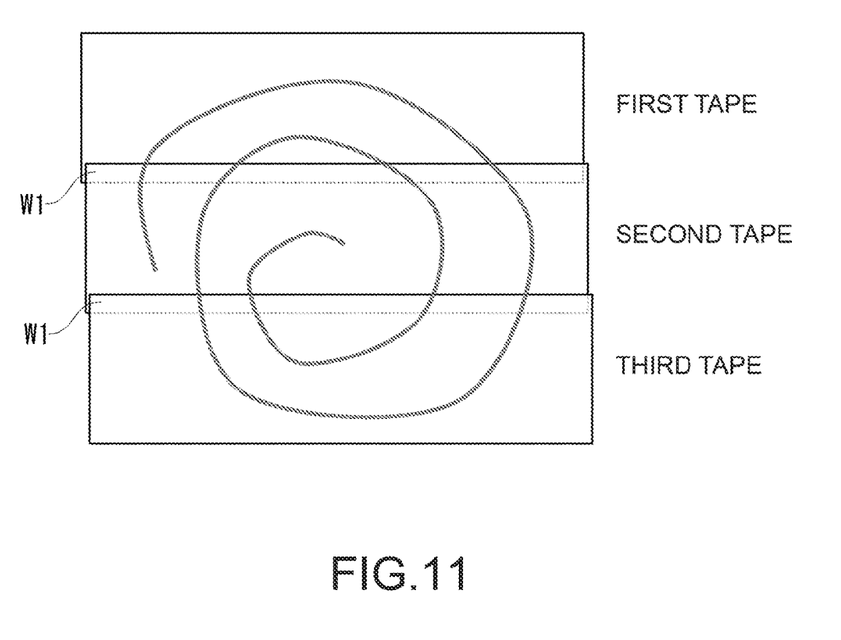
FIG. 11 is an explanatory view of Modification 3.

If the input trajectory 50 is inputted beyond the input available area 40 based on the tape width that is set, print data to print on a plurality of tapes may be generated so that a desired label (print result equivalent to the display on the preview display unit 12) can be obtained by bonding the plurality of tapes with overlaps, as shown in FIG. 11. In this case, in order to improve the appearance of the result of the bonding, it is preferable that an overlap margin W1 is provided at a top part (or bottom part) in the direction of width of the second tape and onward and that no print is made in the part of the overlap margin W1 of the tape that comes below the other tape in the direction of overlap when bonded, or the same image as the image in the overlap margin W1 of the bottom end part (or top end part) of the tape that comes above the other tape in the direction of overlap is printed.

Other Modifications

In the embodiment, the tape length is extended when the input trajectory 50 extends beyond the input available area 40. However, the tape length may be extended when the input trajectory 50 extends beyond the tape image T instead of the input available area 40.

In the embodiment, the pen mark M1 and the eraser mark M2 are displayed in the handwriting mode. However, these marks may be hidden. Whether to display or hide these marks may be switchable by the user.

Each component of the host device 1 described in the embodiment may be provided as a program. The program may be stored in various recording media (CD-ROM, flash memory and the like) and provided in this way. That is, a program for causing a computer to function as each component of the host device 1, and a recording medium with the program recorded therein are included in the scope of the invention. Moreover, suitable changes can be made without departing from the scope of the invention, such as causing the host device 1 to operate using a cloud computing technique.

What is claimed is:
1. A print data generation device comprising:
a preview display screen which displays a handwritten input trajectory on a tape image showing an outer shape of a tape, the handwritten input trajectory input by a user performing handwriting on the preview display screen; and
at least one processor configured to:
perform display control of the preview display screen; and
generate print data to print an image based on the input trajectory, on the tape with a size based on the tape image displayed by the preview display screen,
wherein
in response to the handwriting being performed outside the tape image, the at least one processor controls the preview display screen to enlarge the tape image in real time with an extension of the input trajectory by a length that includes a portion of the handwritten input trajectory that is disposed outside the tape image and a margin having a predetermined length from an end of the input trajectory to an end of the tape image, and
the at least one processor predicts an amount of movement per unit time of the input trajectory according to a change in input velocity or a change in input acceleration of the input trajectory and adjusts an amount of enlargement of the tape image based on the prediction.
2. The print data generation device according to claim 1, wherein the at least one processor enlarges the tape image in a horizontal direction and does not enlarge the tape image in a vertical direction.

3. The print data generation device according to claim 2, wherein the at least one processor enlarges the tape image in the horizontal direction in such a way that a coordinate of a position extended outward in the horizontal direction of the tape image by a predetermined length from an end coordinate of the input trajectory in the horizontal direction of the tape image becomes an end coordinate of the tape image.

4. The print data generation device according to claim 3, wherein if the end part of the input trajectory in the horizontal direction of the tape image is erased, the at least one processor reduces the tape image in the horizontal direction in such a way that a coordinate of a position extended outward in the horizontal direction of the tape image by a predetermined length from the end coordinate after the erasure of the input trajectory becomes the end coordinate of the tape image.

5. The print data generation device according to claim 4, wherein the preview display screen is able to display input information including the input trajectory that is handwritten and non-handwritten information that is a letter or image other than the handwritten input trajectory, on the tape image, and
the at least one processor generates the print data to print an image based on the input information.

6. The print data generation device according to claim 5, wherein the at least one processor enlarges or reduces the tape image on condition that the end coordinate of the input trajectory in the horizontal direction of the tape image is further to the outside in the horizontal direction than the end coordinate of the non-handwritten information.

7. The print data generation device according to claim 2, wherein the at least one processor predicts a direction of movement of the input trajectory according to change in the input trajectory and enlarges the tape image on the basis of the result of the prediction.

8. A method for controlling a print data generation device, comprising:
displaying a handwritten input trajectory on a tape image showing an outer shape of a tape, the handwritten input trajectory being input by a user performing handwriting on the preview display screen;
generating print data to print an image based on the input trajectory, on the tape with a size based on the tape image displayed in the displaying of the input trajectory;
enlarging the tape image in real time with an extension of the handwritten input trajectory, in response to the handwriting being performed outside the tape image, by a length that includes a portion of the handwritten input trajectory that is disposed outside the tape image and a margin having a predetermined length from an end of the input trajectory to an end of the tape image;
predicting an amount of movement per unit time of the input trajectory according to a change in input velocity or a change in input acceleration of the input trajectory; and
adjusting an amount of enlargement of the tape image based on the prediction.

9. A non-transitory computer readable storage medium that stores a program causing a computer to function as each unit in the print data generation device according to claim 1.

10. A non-transitory computer readable storage medium that stores a program causing a computer to function as each unit in the print data generation device according to claim 2.

11. A non-transitory computer readable storage medium that stores a program causing a computer to function as each unit in the print data generation device according to claim 3.

12. A non-transitory computer readable storage medium that stores a program causing a computer to function as each unit in the print data generation device according to claim 4.

13. A non-transitory computer readable storage medium that stores a program causing a computer to function as each unit in the print data generation device according to claim 5.

14. A non-transitory computer readable storage medium that stores a program causing a computer to function as each unit in the print data generation device according to claim 6.

15. A non-transitory computer readable storage medium that stores a program causing a computer to function as each unit in the print data generation device according to claim 7.

16. The print data generation device according to claim 6, wherein when the end coordinate of the input trajectory in the horizontal direction of the tape image is further to the outside in the horizontal direction than the end coordinate of the non-handwritten information, the at least one processor calculates a necessary tape length.

* * * * *